United States Patent [19]

Kondis

[11] Patent Number: 4,693,754
[45] Date of Patent: Sep. 15, 1987

[54] ALUMINUM PARTICLES RESISTANT TO REACTION WITH WATER

[76] Inventor: Tom Kondis, 842 Stevendale Dr., Pittsburgh, Pa. 15221

[21] Appl. No.: 709,391

[22] Filed: Mar. 7, 1985

Related U.S. Application Data

[63] Continuation-in-part of Ser. No. 705,059, Feb. 26, 1985, abandoned, which is a continuation of Ser. No. 420,447, Sep. 20, 1982, abandoned.

[51] Int. Cl.$^4$ .......................... C04B 14/34; C09C 1/62
[52] U.S. Cl. .................................. 106/290; 106/309; 252/389.54
[58] Field of Search ................................ 106/290–291, 106/308 B, 309; 241/16, 21; 252/389.5, 389.54; 501/19

[56] References Cited

U.S. PATENT DOCUMENTS

| | | | |
|---|---|---|---|
| 3,067,052 | 12/1962 | Frieser et al. | 106/290 |
| 4,234,653 | 11/1980 | Ballard et al. | 106/290 |
| 4,537,632 | 8/1985 | Mosser | 106/14.12 |

FOREIGN PATENT DOCUMENTS 1230696 12/1966 Fed. Rep. of Germany ... 252/389.5
55-148750 11/1980 Japan .

*Primary Examiner*—Mark L. Bell
*Attorney, Agent, or Firm*—Thomas H. Murray; Clifford A. Poff

[57] ABSTRACT

A process is provided by which aluminum particles are treated by inorganic reagents in essentially organic media to avoid inefficiencies of aqueous treatments. Particles may be treated separately, or they may be treated in situ during comminution. Inorganic reagent is induced to enter the organic phase through the employment of water, a coupling agent, or both.

26 Claims, No Drawings

ALUMINUM PARTICLES RESISTANT TO REACTION WITH WATER

CROSS-REFERENCE TO RELATED APPLICATION

This application is a continuation-in-part of U.S. application Ser. No. 705,059, filed Feb. 26, 1985, which application is a continuation of application Ser. No. 420,447, filed Sept. 20, 1982 both now abandoned.

BACKGROUND OF THE INVENTION

Because air purity standards limit emissions of organic compounds into the atmosphere, paint manufacturers have been substituting water for organic solvents and diluents in their products. This trend poses a serious threat to existing markets for aluminum pigments, which are used extensively in organic-based coatings such as decorative automotive top coats, asphaltic roof coatings and metallic maintenance paints. Aluminum readily reacts chemically with water to produce hydrogen gas and aluminum hydroxide according to the chemical equation:

$$2Al + 6H_2O \rightarrow 2Al(OH)_3 + 3H_2$$

This reaction occurs relatively rapidly with aluminum pigments due to the high surface to mass ratio of the small particles, and the reaction destroys the unique metallic pigmentation properties of the tiny aluminum mirror-like particles by converting them to a hydrated oxide form unsuitable for pigment use. More importantly, the reaction also generates hydrogen gas, which is a fire and explosion hazard.

To a lesser degree, this same aluminum-water reaction also affects other particulate aluminum products used industrially as chemical intermediates, and in such products as rocket propellants, explosives, cold solders, structural adhesives and many other products. Accidental exposure to water, particularly during shipping or storage, poses the same safety hazards through hydrogen generation and the same potential functional losses through oxidation of the metallic aluminum.

SUMMARY OF THE INVENTION

The present invention resides in the discovery that small aluminum particles can be effectively treated with inorganic reagents in a mixed organic-inorganic liquid medium. Inorganic metallic compounds have been found to be particularly well suited in such treatments, and, preferentially, those compounds which contain the metallic component in the anionic portion of the molecule. Compounds such as vanadates, chromates and dichromates, or those which are easily convertible to vanadates, chromates and dichromates, are particularly preferred.

DETAILED DESCRIPTION OF THE INVENTION

Investigators have expended much effort in attempts to apply aqueous treatments, known to be effective in protecting large aluminum objects such as billet, slab, extrusions, sheet or other such macroscopic objects against attack by water, steam or salt spray, to the similar protection of small aluminum particles, especially aluminum pigments. Some such treatments failed because they produced surface conversions having thicknesses inappropriate to the size of the small particles being treated; whereas relatively thick sections of aluminum metal may tolerably be converted to a protective coating on macroscopic objects, such treatment of tiny particles may convert the entire individual particle, or a significant portion thereof, to a form not suitable for the product's intended end use. Others failed because they relied upon electrical methods of treatment, such as electrodeposition, thereby creating physical problems associated with including the tiny particles to be treated as part of the required electrical circuit. Still other treatments failed, or met with only limited success, due to the difficulty in efficiently dispersing aluminum pigment particles in aqueous solutions, even with the addition of dispersion aids or surfactants. In the latter instance, although part of the surfaces become treated, some surface, protected by agglomeration, remains free of treatment. For example, Rudolf G. Frieser, et al, in their attempts to impart a gold color to aluminum pigments from aqueous potassium permanganate solution as reported in their U.S. Pat. No. 3,067,052 dated Dec. 4, 1962, found that their treatment was ineffective for aluminum powders finer than 400 mesh (column 2, lines 3 to 5); the majority of aluminum pigment particles are in fact finer than 400 mesh.

In addition to attempts reported in the general technical literature, aluminum pigments have been subjected to various conditions of steam, boiling water and dry heat in order to change the structure of the natural aluminum surface oxide. Although oxide changes were confirmed, none of the treated pigments exhibited any improvement in chemical stability (in those cases where the metal particles were not entirely oxidized by the treatment).

Aqueous treatments employing a variety of inorganic phosphate, chromate and molybdate compounds to convert the oxide layer also failed to improve chemical stability. While evidence indicated that aluminum oxide surfaces had been converted, chemical stability of the treated pigments was unsatisfactory.

In my laboratory investigations, I have observed a universal tendency of aluminum flake pigment particles to agglomerate to various degrees in water, even in the presence of surfactants and energetic mixing techniques such as ultrasonic mixing. For example, particle size distribution analyses based on the popular Coulter Counter technique (Coulter Electronics, Inc.) rely on particle dispersions in an electrolyte, so aqueous systems are generally the media of choice for this analytical technique. However, aluminum flake pigments manifest finer particle size distributions, without exception, when analyzed in an alcoholic electrolyte composed of ammonium thiocyanate in isopropyl alcohol, than when the same pigments are analyzed in aqueous electrolytes. The coarser particle size distribution present in the aqueous electrolytes indicates a higher degree of agglomeration than is present in the alcoholic electrolyte.

Treatment of aluminum pigments with inorganic reagents in organic liquids, where the pigments may be easily dispersed with a minimum of agglomeration due to the generally low surface tensions of organic liquids, presents a serious obstacle to be overcome. Inorganic reagents are generally insoluble in organic liquids, or their solubility is restricted to specific systems or conditions so that a choice is cumbersome in the laboratory and commercially unattractive in the production plant.

I have found, however, that I may effectively treat aluminum pigments in water-miscible organic liquids containing minor amounts of water, thereby circumventing the dispersion problem. I have found further that I may extend such treatments to organic liquids, which are immiscible with water, through the use of a coupling agent which is miscible with both water and the organic liquid, thereby carrying effective quantities of water into the organic phase in the manner described in my copending patent application Ser. No. 709,401 entitled Leafing Aluminum Pigments of Improved Quality, filed concurrently herewith. I have found, surprisingly, that although only relatively small, but significant, quantities of water are carried into the organic phase in this way, the water may carry along adequate inorganic reagent to treat the aluminum surfaces. Apparently, the inorganic reagent may exist as a separate phase reservoir to be metered slowly into the organic phase as reaction depletes reagent concentration, in similar manner as described for water in my copending patent application Ser. No. 709,401.

Preferably, the water-miscible organic liquid is miscible with at least 5% water by volume. It may be a blend of water-immiscible organic liquid with another organic liquid which is mutually miscible with both water and the water-immiscible organic liquid. In treating aluminum particles in the presence of a water-miscible organic liquid and a minor quantity of water, the water preferably comprises a maximum of 40% of the total liquid volume.

The following examples will illustrate the scope of my invention, but are not intended to serve as limitations. For these examples, a test has been devised to accelerate attack of the treated aluminum pigments by water, and to therefore quickly assess the degree to which the aluminum surface is protected by a particular treatment. A sample containing 1.0 gram aluminum is weighed into a test tube, and 25 milliliters 0.01M sodium tetraborate solution, $Na_2B_4O_7$ in water, is added (pH in the 9-10 range, slightly basic). The test tube is fitted with a rubber stopper and is connected by flexible tubing to an inverted, water-filled buret. The test tube is then inserted into an oil bath maintained at 140° F., and one hour is allowed for expansion of the head space gases and temperature equilibration of the test slurry. Thereafter, the volume of hydrogen gas generated by reaction of the aluminum is measured by displacement of the water in the buret. This is an extremely aggressive test, and is hereinafter referred to as the "Borax Test". By way of comparison, unprotected aluminum particles react completely within 7 hours in the Borax Test (one hour equilibration period plus 6 hours measured hydrogen evolution), whereas these same aluminum particles react to an insignificant degree in netural water (pH=7) or under slightly acidic conditions (pH in the 5-6 range).

EXAMPLE I

Alcoa nonleafing pigment grade 7370, described by the manufacturer as "a highly corrosion resistant aluminum pigment" and typically used in metallic paint finishes for automobiles, was employed in the form of filter cake for this example. Filter cake, obtained by filtering an aluminum pigment slurry in mineral spirits as it is produced in a ball mill, consists of approximately 80% by weight aluminum and 20% by weight mineral spirits.

Grade 7370 cake and ammonium dichromate were slurried in various proportions in n-propanol. No attempt was made to dry the alcohol before use. It was observed, from color imparted to the solution, that ammonium dichromate has some solubility in n-propanol which contains adventitious water. In order to improve the solubility, one experiment was conducted in which n-propanol was blended with water in the proportion 20 parts by volume water to 80 parts by volume alcohol.

The slurries were heated under reflux for 2 hours, and the treated pigments were recovered by filtration. Excess ammonium dichromate was washed away with warm water, and the pigment product was air-dried after having been rinsed with acetone. The degree of protection afforded to the product pigments by the treatments was evaluated by the Borax Test. These results are summarized in Table 1.

TABLE 1

Reflux Treatments with Ammonium Dichromate Nonleafing Grade 7370

| $(NH_4)_2Cr_2O_7$ Concentration (as % of aluminum metal weight) | Solvent | Borax Test (ml $H_2$ generated) |
|---|---|---|
| none | untreated control | Gross* |
| none | n-propanol | Gross* |
| 1% | n-propanol | 32 ml |
| 6 | n-propanol | 15 |
| 25 | n-propanol | 2.5 |
| 25 | 80/20 n-propanol/$H_2O$ | 1.3 |

*$H_2$ evolution too fast to measure.

The data illustrates that untreated 7370 pigment cannot withstand the aggressive Borax Test. Treatment with ammonium dichromate is highly effective in protecting the metallic aluminum particles, with the effectiveness increasing as the concentration of $(NH_4)_2Cr_2O_7$ increases.

There is little difference between the treatments with excess ammonium dichromate in alcohol containing adventitious water, and in alcohol containing 20% by volume added water, with both treatments adequately protecting the pigment particles. This indicates that the reaction of water with aluminum, which competes with the desired treatment at the aluminum surfaces, is not injurious and does not interfere with the desired protection. For purposes of perspective, 2 ml $H_2$ generated in this test corresponds to the destruction of approximately 1.5 mg metallic aluminum, or less than 0.2% by weight of the aluminum employed in the Borax Test.

EXAMPLE II

Alcoa grades 7370 and 229 nonleafing pigments were slurried in a miscible liquid blend consisting of 90% by volume carbitol acetate (acetate ester of diethylene glycol monoethyl ether, supplied by Union Carbide Corp.) and 10% by volume water. Reagents were employed at a concentration of 11% based on the weight of metallic aluminum in the slurry. Reactions were run both with and without acidification (1% added acetic acid). The slurries were stirred and heated to reflux for one hour, after which they were filtered, while hot. Filter cakes were washed thoroughly with warm water, followed by an acetone rinse to remove residual water. The air-dried, treated pigments were subjected to the Borax Test.

TABLE 2

Borax Test Results
One Hour Reflux Treatment

| Reagent | Alcoa Grade 229 | Alcoa Grade 7370 |
| --- | --- | --- |
| Ammonium borate | Gross | Gross |
| Ammonium borate + 1% CH$_3$COOH | Gross | Gross |
| Ammonium molybdate | Gross | Gross |
| Ammonium molybdate + 1% CH$_3$COOH | Gross | Gross |
| Ammonium vanadate | 53 ml | 100 ml |
| Ammonium vanadate + 1% CH$_3$COOH | 0.0 | 38 |

The molybdate and borate reagents are ineffective as protective treatments for aluminum pigments. While 11% ammonium vanadate is somewhat effective after one hour reflux, this treatment is improved by acidification.

EXAMPLE III

Alcoa grades 7370 special nonleafing pigment, 229 standard nonleafing pigment and 6230 standard leafing pigment were treated with ammonium dichromate, chromium trioxide and ammonium vanadate reagents in the following manner. The pigment was slurried in a solution consisting of 90% by volume carbitol acetate and 10% by volume water, along with 33% reagent based on the aluminum metal weight. The slurry was stirred at room temperature for 24 hours, after which it was filtered. The filter cake was washed well with deionized water, followed by a final acetone rinse to remove residual water. The treated pigments were air-dried and then subjected to the Borax Test.

TABLE 3

Borax Test Result

| Reagent | Alcoa Grade 229 | Alcoa Grade 7370 | Alcoa Grade 6230 |
| --- | --- | --- | --- |
| None | Gross | Gross | Gross |
| (NH$_4$)$_2$Cr$_2$O$_7$ | 0.5 ml | 0.0 ml | Gross |
| CrO$_3$ | 0.0 | 0.3 | 0.0 ml |
| NH$_4$VO$_3$ | 0.2 | 0.1 | 0.2 |

These results indicate that aluminum pigments may be treated effectively at room temperature. The failure of 6230 leafing pigment to be protected by the ammonium dichromate treatment indicates that treatment effectiveness may vary somewhat with pigment grade. The results also demonstrate that treatment is effective for standard aluminum pigments, and is not limited to corrosion resistant grades such as 7370.

EXAMPLE IV

Alcoa nonleafing grade 229 was slurried at room temperature in a miscible liquid blend consisting of 70% by volume carbitol acetate and 30% by volume water. Ammonium vanadate reagent concentration and reaction time were varied.

TABLE 4

Room Temperature Slurry Treatments
Alcoa Grade 229
Borax Test Results

| NH$_4$VO$_3$ Conc. | Reaction Time | |
| --- | --- | --- |
| % on aluminum metal | 4 hours | 24 hours |
| 0 | Gross | — |
| 5.6 | 17.8 ml | 0.0 ml |
| 11.1 | 0.0 | 0.0 ml |

These results indicate that treatments by a lower reagent concentration over a long period of time, or by a higher reagent concentration over a shorter period of time, are both effective.

EXAMPLE V

Examples I–IV have demonstrated the effectiveness of post-treatments, both at room temperature and at elevated temperatures; that is, aluminum pigments were collected after having been generated in a ball mill, and were then separately treated as an additional operation. This adds expense to the product, and is therefore not preferred when it may be avoided.

In this example, pigment is treated in situ as it is generated in the ball mill. In the laboratory, a Matheson Model No. 804 one liter capacity stainless steel cylinder was employed as the mill. The grinding medium consisted of 1485 grams total assorted stainless steel balls varying from quarter inch to half inch in diameter. A standard Red Devil wrist-type paint shaker provided vibratory energy for grinding. One end of the steel cylinder was plugged, and the other end was fitted with a Whitey 43S4 stainless steel bar stock ball valve to allow admission of selected gases under pressure.

Mills were charged with 56 g Alcoa grade 120 atomized aluminum powder, 62 ml mineral spirits, 10 ml carbitol acetate, 2.8 g lubricant, either 1.0 ml (1.8%) or 4.0 ml (7.1%) water, and 5 psi oxygen added to the 15 psi ambient atmosphere for a total mill pressure of 20 psi. Except for the control mills, either 2.8 g (5%) or 5.6 g (10%) solid ammonium vanadate was also charged to the mills before pressing in O$_2$. The percentages indicated in parentheses are weight proportions based on the weight of aluminum charged to the mill.

Because water is not miscible with mineral spirits, the purpose of the carbitol acetate is to act as a coupling solvent and allow some water to enter the mineral spirits phase, just as in my copending patent application entitled Leafing Aluminum Pigments of Improved Quality, concurrently filed herewith.

The charged contents were milled 3 hours under the vibratory action of the Red Devil. The product slurry was scalped through an 80-mesh screen to remove oversize particles, then was filtered. The filter cake was rinsed briefly with hexane, and the pigment was spread on aluminum foil to dry at room temperature. Borax Test results of the product pigments are summarized in Table 5.

TABLE 5

In Situ Ammonium Vanadate Treatments
Borax Test Results

| NH$_4$VO$_3$ Concentration | Water Concentration | Lubricant | |
| --- | --- | --- | --- |
| | | Lauric Acid | Stearic Acid |
| None | 1.8% | Gross | Gross |
| 5% | 1.8 | 12.9 ml | 2.1 ml |
| 5 | 7.1 | 11.8 | 2.2 |
| 10 | 1.8 | 0.2 | 1.9 |
| 10 | 7.1 | 2.8 | 1.9 |

All of the pigments generated in Table 5 are usable for their normally intended commercial purposes. Quite surprisingly, the relatively minor quantity of water admitted into the mineral spirits phase by the coupling agent carries along sufficient ammonium vanadate reagent to effectively treat the developing aluminum surfaces. Therefore, this in situ treatment does not significantly alter conventional manufacturing practices, and allows manufacturers to retain the use of their current mills, and of their currently preferred hydrocarbon slurrying liquids.

The chemical stability imparted to the product.pigments of Table 5 is principally a combined function of the pigment being produced (surface area and particle size), the reagent concentration, and the water/coupling agent concentrations (controlling the rate at which reagent is admitted to the organic phase). The quantity of reagent required to produce stable pigments is dependent upon the pigment grade being produced; finer pigments having high surface areas require more reagent than coarse pigments having low surface areas. This required quantity of reagent may be estimated from surface area measurements of the pigment grades to be treated, but is best determined through practice. Reagent may also be added incrementally throughout the milling operation to avoid premature depletion of reagent. As taught in my copending patent application Ser. No. 709,401 entitled Leafing Aluminum Pigments of Improved Quality filed concurrently herewith, water may also be added incrementally to preserve its proper function throughout the milling cycle and counteract loss through volatilization.

Because excess reagent resides in the mill slurry as a separate solid phase or in solution in a separate water phase, being metered into the mineral spirits phase as needed through the joint action of water and the coupling agent, unused reagent may be incorporated into the final pigment product. This excess reagent may be washed from the product in a separate processing step. An economically preferred choice, however, is to adjust the initial reagent concentration to the pigment grade being milled and to the degree of protection desired, so that the amount remaining with the product pigment is insignificant.

The foregoing examples illustrate the scope of my invention. Reagents other than those specifically named are expected to be effective when applied according to my teachings. For example, meta vanadic acid, $HVO_3$, may be a highly effective reagent, and may in fact realistically represent the nature of the active species present in Table 2 when ammonium vanadate is combined with acetic acid under the refluxing conditions of that experiment. Vanadium pentoxide, $V_2O_5$, is the anhydride form of $HVO_3$ and may be economically preferred.

In general, while post-treatments of pigments recovered from the ball mill may be effective, they also may add equipment and handling costs, as well as wastefully employ reagent. The relatively high reagent concentrations and reaction times required in Examples I-IV may be due in part to the existence of a natural oxide layer already in place on the aluminum pigment particle surfaces. On the other hand, in situ treatment during the milling process allows reagent to compete for the nascent aluminum surfaces along with lubricant, oxygen and water, as these surfaces are being developed. As indicated in Example V, this in situ treatment is highly effective and employs relatively lesser quantities of reagent. In this preferred embodiment of my invention, reagent concentrations less than 1%, calculated on the weight of aluminum to be converted into pigment, are expected to lose their effectiveness through incomplete coverage of the generated surfaces, and reagent concentrations higher than 12%, while still effective, are expected to be wasteful throgh incomplete consumption of reagent.

I claim as my invention:

1. A process comprising treating aluminum particles in the form of a slurry in the presence of a water-miscible organic liquid, a minor quantity of water, and an inorganic reagent capable of protecting the aluminum particles against subsequent attack by water, steam, or corrosive aqueous solutions, said inorganic reagent being one selected from the group consisting of the compounds of chromium and vanadium and being present at a concentration of about 1% to about 33% by weight on the weight of aluminum particles treated.

2. The process of claim 1 in which the water-miscible organic liquid is miscible with at least 5% water by volume.

3. The process of claim 1 in which the minor quantity of water comprises a maximum of 40% of the total liquid volume.

4. The process of claim 1 in which the inorganic reagent is one or more compounds chosen from the group chromium trioxide, ammonium dichromte, ammonium vanadate, vanadium pentoxide and meta vanadic acid.

5. The process of claim 1 in which the aluminum particles are aluminum pigments.

6. The process of claim 1 in which the aluminum particles are atomized aluminum powder.

7. The process of claim 1 in which the aluminum particles are mechanically comminuted recovered waste aluminum, such as chopped foil, grinding scrap, lathe shavings or chopped scrap.

8. The process of claim 1 in which the aluminum particles are rapidly-chilled splat particles.

9. A pigment which comprises aluminum particles treated with an inorganic reagent selected from the group consisting of vanadium compounds and chromium compounds, said inorganic reagent protecting the surfaces of said particles against attack from a corrosive aqueous medium.

10. The pigment of claim 9 wherein the inorganic reagent is selected from the group consisting of $V_2O_5$, $HVO_3$, $NH_4VO_3$, $(NH_4)_2Cr_2O_7$ and $CrO_3$.

11. An aluminum particle-containing coating wherein the aluminum therein is treated with an inorganic reagent which is a compound selected from the group consisting of vanadium compounds and chromium compounds in an amount effective for retarding the reaction of the aluminum with water for inhibiting the generation of hydrogen gas.

12. A composition of matter which comprises aluminum particles treated with an inorganic reagent which is a compound selected from the group consisting of vanadium compounds and chromium compounds in an effective concentration to retard the reaction of the aluminum with water, thereby inhibiting the evolution of hydrogen gas.

13. A pigment paste which comprises a major amount of aluminum flakes treated with an inorganic reagent which is a compound selected from the group consisting of vanadium compounds and chromium compounds, said pigment paste providing aluminum flake in a form capable of resisting attack from a corrosive aqueous medium.

14. Aluminum particulates which are treated with an inorganic reagent which is a compound selected from the group consisting of vanadium compounds and chromium compounds whereby said aluminum particulates are protected from reaction with water which would otherwise result in the evolution of hydrogen gas.

15. An aluminum pigment which contains aluminum flakes which are treated with an inorganic reagent which is a compound selected from the group consisting of vanadium compounds and chromium compounds in an amount effective to provide aluminum flakes capable of resisting attack from water.

16. A process comprising milling aluminum particles in the presence of a liquid hydrocarbon; a milling lubricant; water; a coupling agent which is an organic liquid miscible with water and with said liquid hydrocarbon and which comprises 3% to 30% by volume of the total liquids charged to the mill; and an inorganic reagent capable of protecting the newly-developed aluminum surfaces against subsequent attack by water, steam, or corrosive aqueous solutions, said inorganic reagent being one selected from the group consisting of compounds of chromium and vanadium and being present at a concentration of about 1% to about 12% by weight on the weight of aluminum particles charged to the mill.

17. A process as defined in claim 16 in which the coupling agent is diethylene glycol monoethyl ether acetate.

18. A process as defined in claim 16 in which the coupling agent is a surfactant, detergent or dispersing aid capable of solvating water in said liquid hydrocarbon.

19. A process as defined in claim 16 in which the said inorganic reagent is one or more compounds selected from the group consisting of chromium trioxide, ammonium dichromate, ammonium vanadate, vanadium pentoxide, and meta vanadic acid.

20. A process as defined in claim 19 in which the coupling agent is diethylene glycol monoethyl ether acetate.

21. A process as defined in claim 19 in which the coupling agent is a surfactant, detergent or dispersing aid capable of solvating water in said liquid hydrocarbon.

22. A pigment which comprises aluminum particles treated with an inorganic reagent selected from the group consisting of vanadium compounds, said inorganic reagent protecting the surfaces of said particles against attack from an aqueous medium.

23. The pigment of claim 22 wherein the inorganic reagent is selected from the group consisting of $V_2O_5$, $HVO_3$ and $NH_4VO_3$.

24. An aluminum particle-containing coating wherein the aluminum therein is treated with an inorganic reagent which is a compound selected from the group consisting of vanadium compounds in an amount effective for retarding the reaction of the aluminum with water for inhibiting the generation of hydrogen gas.

25. A composition of matter which comprises aluminum particles treated with an inorganic reagent which is a compound selected from the group consisting of vanadium compounds in an effective concentration to retard the reaction of the aluminum with water, thereby inhibiting the evolution of hydrogen gas.

26. Aluminum particulates which are treated with an inorganic reagent which is a compound selected from the group consisting of vanadium compounds whereby said aluminum particulates are protected from reaction with water which would otherwise result in the evolution of hydrogen gas.

* * * * *